United States Patent
Nomura et al.

(10) Patent No.: US 9,328,815 B2
(45) Date of Patent: May 3, 2016

(54) RACK BAR AND RACK BAR TEETH FORMING DIE

(71) Applicant: NETUREN CO., LTD., Tokyo (JP)

(72) Inventors: Makoto Nomura, Tokyo (JP); Takashi Yamawaki, Tokyo (JP); Ryosuke Suzuki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 46 days.

(21) Appl. No.: 13/923,038

(22) Filed: Jun. 20, 2013

(65) Prior Publication Data

US 2013/0340554 A1    Dec. 26, 2013

(30) Foreign Application Priority Data

Jun. 21, 2012  (JP) ................. 2012-139552

(51) Int. Cl.
| | |
|---|---|
| *F16H 1/04* | (2006.01) |
| *F16H 55/08* | (2006.01) |
| *F16H 55/10* | (2006.01) |
| *F16H 55/26* | (2006.01) |
| *B21J 13/02* | (2006.01) |
| *B62D 3/12* | (2006.01) |
| *B21K 1/76* | (2006.01) |

(52) U.S. Cl.
CPC .............. *F16H 55/26* (2013.01); *B21J 13/02* (2013.01); *B21K 1/768* (2013.01); *B62D 3/126* (2013.01); *Y10T 74/1967* (2015.01)

(58) Field of Classification Search
CPC ........ B21K 1/767; B21K 1/768; B62D 3/126; F16H 55/26; F16H 19/04
USPC ........... 74/109, 422, 437, 457, 460, 462, 498; 72/469; 29/893.34
See application file for complete search history.

(56) References Cited

U.S. PATENT DOCUMENTS

| | | | | |
|---|---|---|---|---|
| 4,133,221 | A | * | 1/1979 | Clary ............................ 74/498 |
| 4,598,451 | A | * | 7/1986 | Ohki ............................ 29/893.3 |
| 7,168,282 | B2 | * | 1/2007 | McLean ........................ 72/356 |
| 2002/0044439 | A1 | | 4/2002 | Shiokawa | |

FOREIGN PATENT DOCUMENTS

| | | | | |
|---|---|---|---|---|
| DE | 10 2010 032 401 | | 2/2012 | |
| JP | 57-73268 | | 5/1982 | |
| JP | 57073268 | A * | 5/1982 | ............. F16H 55/26 |
| JP | 3-138042 | | 6/1991 | |
| JP | 2007253190 | A | 10/2007 | |
| JP | 2008264874 | A | 11/2008 | |

OTHER PUBLICATIONS

English translation of Chinese Office Action, issued on May 5, 2015, in corresponding Chinese Appln. No. 201310250019.7.
Extended European Search Report issued Feb. 23, 2016 in corresponding European Application No. 13173257.0.

* cited by examiner

*Primary Examiner* — William Kelleher
*Assistant Examiner* — Jake Cook
(74) *Attorney, Agent, or Firm* — Wenderoth, Lind & Ponack, L.L.P.

(57) ABSTRACT

A rack bar includes a shaft portion, a rack toothed portion provided on the shaft portion, and a dummy toothed portion. The rack toothed portion includes a plurality of rack teeth provided side by side in an axial direction of the shaft portion, each of the rack teeth including a contact face arranged obliquely relative to the axial direction to contact the pinion gear. The dummy toothed portion includes at least one dummy tooth provided on at least one side of the rack toothed portion in the axial direction such that the dummy tooth is arranged parallel to and next to the rack teeth. The dummy tooth is designed such that a whole height of the dummy tooth is smaller than a whole height of each of the rack teeth.

5 Claims, 6 Drawing Sheets and RACK BAR AND RACK BAR TEETH FORMING DIE

CROSS-REFERENCE TO RELATED APPLICATION

The present application claims priority from Japanese Patent Application No. 2012-139552 filed on Jun. 21, 2012, the entire content of which is incorporated herein by reference.

FIELD OF INVENTION

The present invention relates to a rack bar which is used in as rack and pinion gear which is used in turn in a power steering system of a motor vehicle, and more particularly to a technique which realizes an improvement in steering force transmission efficiency with a pinion gear in addition, the invention relates to a rack bar teeth funning die for forming a rack bar, and more particularly to a rack bar teeth forming die for forming a rack bar which is improved in steering force transmission efficiency with a pinion gear.

BACKGROUND

A steering system for steering a vehicle includes a pinion gear on the side of a steering shaft and a rack bar on which rack teeth are formed on the side of tie-rods which connect left and right, front road wheels. Then, rotational steering force transmitted from a steering wheel is converted to a horizontal lateral force by a steering gear box, and the horizontal lateral force is then transmitted to the mad wheels by way of the pinion gear and the rack teeth, whereby a rotational force around king pins is applied to the road wheels (see, e.g., JP2007-253190A).

On the rack bar, the steering force transmitted from the steering wheel is transmitted from contact faces of the pinion gear and the rack teeth. Consequently, the larger the contact faces, are the more efficiently the steering force can be transmitted.

In addition, as a method for producing a hollow rack bar, a method is known for rolling and forging as cylindrical metal member from an inside thereof. In this method, a mandrel is press fitted in an interior of the cylindrical metal member so as to a metal material to flow into recess portions of a die to thereby form rack teeth (see, e.g., JP2008-264874A).

The rack bar described above has the following problem. Namely, as a method for forming a rack bar, there is known a method for press forging a pipe member 410 as shown in FIG. 8. The pipe member 410 is fixed in place by molds K1 and K2. A central portion of the pipe member 410 is collapsed flat into a central recess portion in advance by using a separate die, and a teeth forming die 430 is brought into abutment with this central recess portion 405. In this method, a mandrel T having a tapered projection T1 on an upper surface side thereof is press fitted into the pipe member 410. A material of the central recess portion 405 is caused to project into recess portions of the teeth forming die 430 by the projection T1 on the mandrel T. Thereafter, the mandrel T is replaced with a mandrel having a slightly larger projection T1 and the replacement mandrel is then press fitted into the pipe member 410. By repeating this process, the material of the central recess portion 405 projects progressively, whereby rack teeth are formed.

As shown in FIGS. 9 and 10, when a rack bar 411 is formed which has rack teeth which are formed over the whole area of the central recess portion 405 of the pipe member 410 in an axial direction thereof, rack teeth which are smaller than those at a central portion are formed at portions lying near axial end portions of a rack toothed portion LB1. For example, as to rack teeth H1, H2, materials in ranges L1, L2 project into the recess portions of the teeth forming die 430 when the pipe member 410 is rolled and forged, whereby the rack teeth H1, H2 are formed. The materials supplied from the ranges L1, L2 are not sufficient to fill the recess portions of the teeth forming die 430, and therefore, the rack teeth H1, H2 are formed smaller than other rack teeth. The rack teeth H1, H2 which are formed in this way do not have required strength and durability and steering force transmission efficiency with the pinion gear. From the reason described above, the rack teeth lying near the axial end portions are formed smaller than the other rack teeth. Because of this, the strength and durability and steering force transmission efficiency with the pinion gear of the rack teeth are not sufficient at the portions lying near the axial end portions of the rack toothed portion.

In contrast with this, as shown in FIGS. 11 and 12, when a rack bar 412 is formed which has flat portions F1 near end portions of a central recess portion 405 of a pipe member 410, even at end portions of a rack toothed portion LB, a material of which a rack tooth H3 is formed can be supplied sufficiently from the flat portion F1. Because of this, the rack tooth H3 having the sufficient strength and durability and steering, force transmission efficiency with the pinion gear can be formed over the Whole area of the rack toothed portion LB2. On the other hand, the thickness of the flat portion F1 is reduced because the material thereof is supplied to the rack toothed portion LB2. The strength and durability of the flat portion F1 whose thickness is so reduced are reduced, and therefore, the strength and durability of the rack bar itself become insufficient.

SUMMARY

It is an object of the invention to provide a rack bar having sufficient strength and durability and steering force transmission efficiency with a pinion gear even near end portions of a rack toothed portion and a rack bar teeth forming die for forming such a rack bar.

According to an aspect of the present invention, a rack bar is provided. The rack bar is configured to mesh with a pinion gear. The rack bar includes a shaft portion, a rack toothed portion provided on the shaft portion, and a dummy toothed portion. The rack toothed portion includes a plurality of rack teeth configured to mesh with the pinion gear. The rack teeth are provided side by side in an axial direction of the shaft portion. Each of the rack teeth includes a contact face arranged obliquely relative to the axial direction to contact the pinion gear. The dummy toothed portion includes at least one dummy tooth provided on at least one side of the rack toothed portion in the axial direction such that the dummy tooth is arranged parallel to and next to the rack teeth. The dummy tooth is designed such that a whole height of the dummy tooth is smaller than a whole height of each of the rack teeth.

According to the invention, a teeth forming die is provided. The teeth forming die is configured to form rack teeth of a rack bar to be meshed with a pinion gear. The teeth forming die includes a securing portion configured to be secured to an outside clamp case, a rack teeth transfer portion provided on the securing portion, and at least one dummy tooth transfer portion. The rack teeth transfer portion includes a plurality of rack tooth transfer portions provided side by side in a line. Each of the rack tooth transfer portions is configured to transfer a profile of each rack tooth. Each of the rack tooth transfer portions includes a contact face transfer portion arranged obliquely relative to a direction of the line in which the rack tooth transfer portions are provided side by side and configured to transfer a profile of a contact face of the rack tooth to be brought into contact with the pinion gear. The dummy tooth transfer portion is configured to transfer a profile of a dummy tooth. The dummy tooth transfer portion is provided on at least one side of the rack teeth transfer portion in the direction of the line such that the dummy tooth transfer portion is arranged parallel, to and next to the rack teeth transfer portion. A whole depth of the dummy tooth transfer portion is shallower than a whole depth of each of the rack tooth transfer portions.

DETAILED DESCRIPTION

Figure 1:
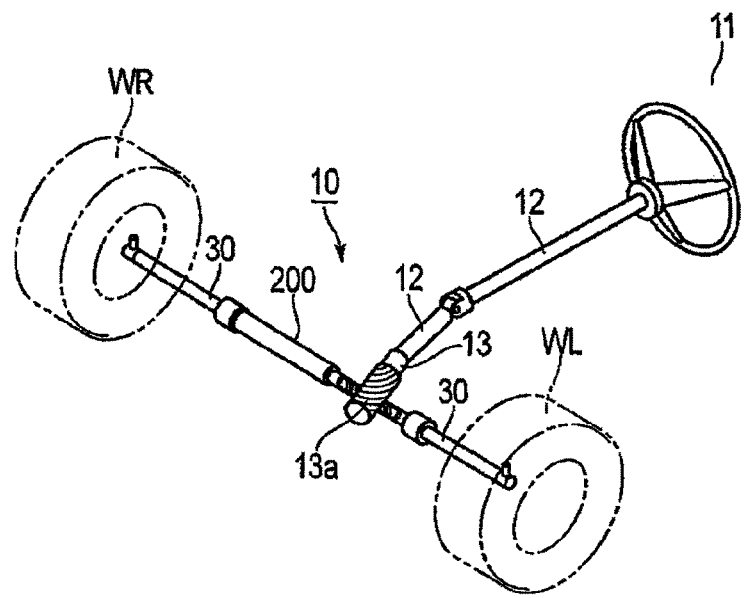
FIG. 1 is a perspective view showing a steering system in which a rack bar according to an embodiment of the invention is incorporated.
Figure 2:
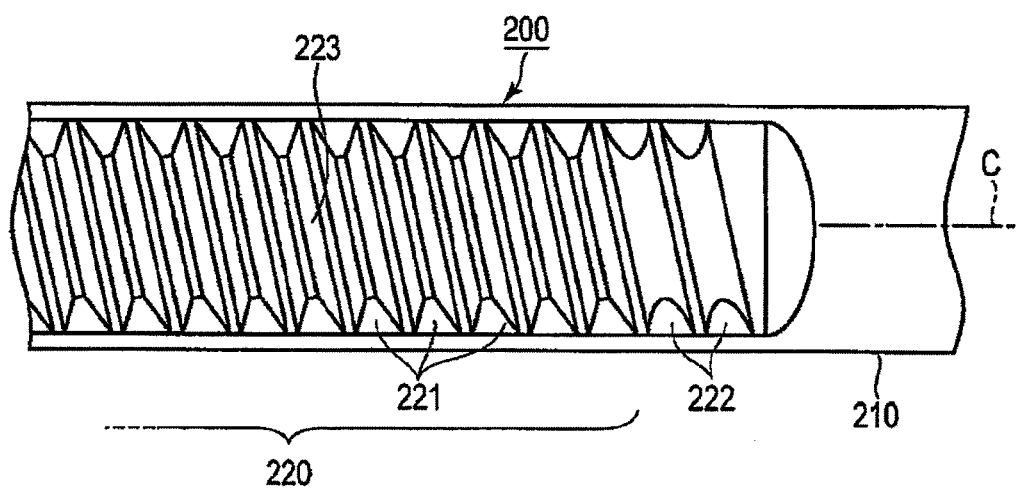
FIG. 2 is a plan view of a portion of the rack bar.
Figure 3:
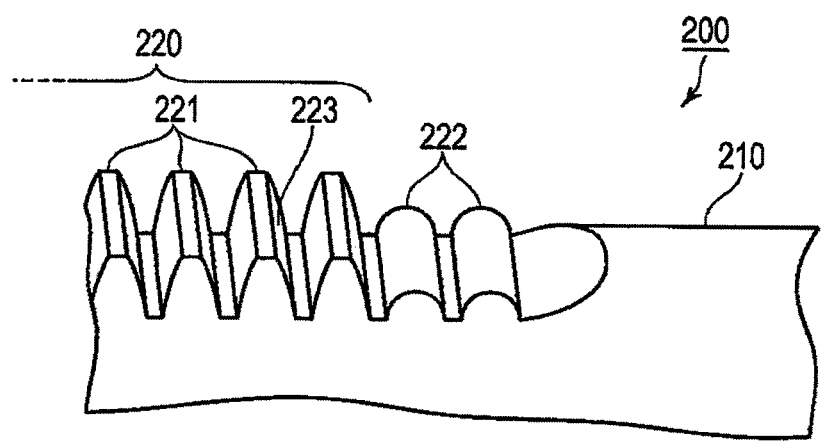
FIG. 3 is a perspective e of the portion of the rack bar.
Figure 4:
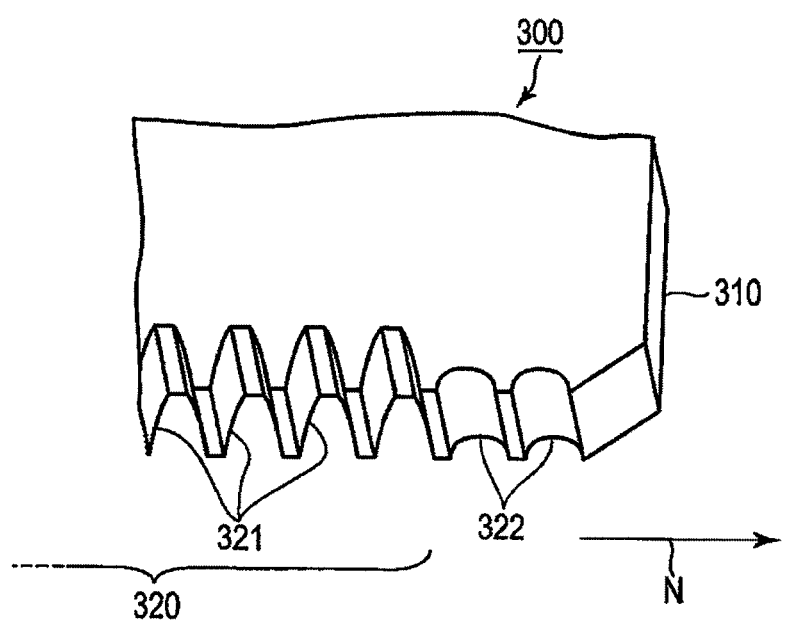
FIG. 4 is a perspective view of a portion of a teeth forming die for forming the rack bar.

FIG. 1 is a perspective view showing a steering system 10 in which a rack bar 200 according to an embodiment of the invention is incorporated, FIG. 2 is a plan view showing a main part of the rack bar 200, FIG. 3 is a perspective view showing the main part of the rack bar 200, and FIG. 4 is a perspective showing to main part of a teeth forming die 300 for transferring a rack teeth 221 and dummy teeth 222 of the rack bar 200. In FIG. 4, N denotes a longitudinal direction of a securing portion 310, which will be described later.

The steering system 10 includes a steering shaft 12 which connects to a steering wheel (a steering member) 11, a pinion shaft 13 that connects to the steering shaft 12 and which has a pinion gear 13a at a distal end thereof, and the rack bar (a pipe member) 200 which meshes with the pinion gear 13a. The rack bar 200 connects further to left and right front road wheels WR, WL via tie-rods 30, 30.

As shown in FIGS. 2 and 3, the rack bar 200 includes a shaft portion 210 which is thrilled of a hollow round bar and a rack toothed portion 220 which is provided at the center of the shad portion 210. In the rack toothed portion 220, a plurality of rack teeth 221 which mesh with the pinion gear are provided parallel along an axis C. Contact faces 223 (contact areas) of the rack teeth 221 which are brought into contact with the pinion gear are disposed obliquely relative to the axial direction C. In addition, the dummy teeth 222 are provided axially outwards of an end portion of the rack toothed portion 220 so as to be parallel to the rack teeth 221 along the axial direction C. The whole height of each of the dummy teeth 222 is smaller than the whole height of each of the rack teeth 221.

The teeth forming die 300 has a substantially rectangular parallelepiped shape and includes a securing portion 310 adapted to be secured to an outside clamp case, a rack toothed portion transfer portion 320 formed on one of surfaces of the securing portion 310 and configured to transfer a profile of the rack toothed portion 220, and dummy tooth transfer portions 322 formed on the same surface as the rack toothed portion transfer portion 320 and each configured to transfer a profile of the dummy tooth 222. In the rack toothed portion transfer portion 320, a plurality of rack tooth transfer portions 321 are provided parallel along the longitudinal direction N of the securing portion 310. The dummy tooth transfer portions 322 are provided axially outwards of an end portion in the longitudinal direction N of the rack toothed portion transfer portion 320 so as to be parallel to the rack tooth transfer portions 321 along the longitudinal direction N. In addition, a whole depth of the dummy tooth transfer portions 322 is formed shallower than a whole depth of the rack tooth transfer portions 321.

Figure 5:
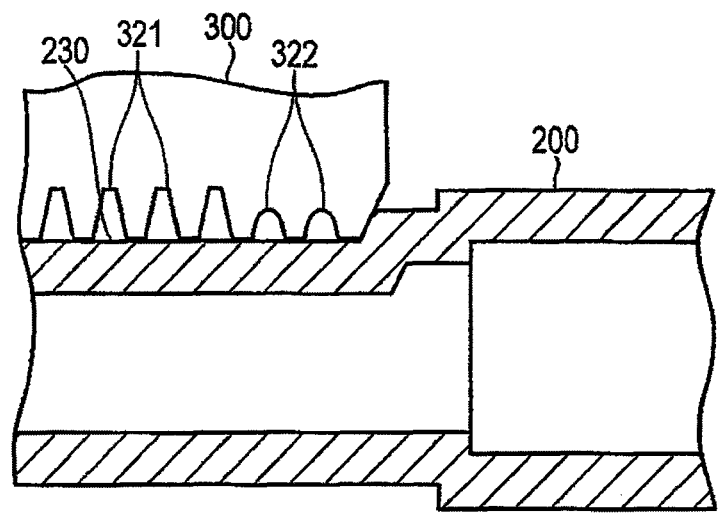
FIG. 5 is a partially cutaway side view illustrating a first step of a process of forming the rack bar.
Figure 6:
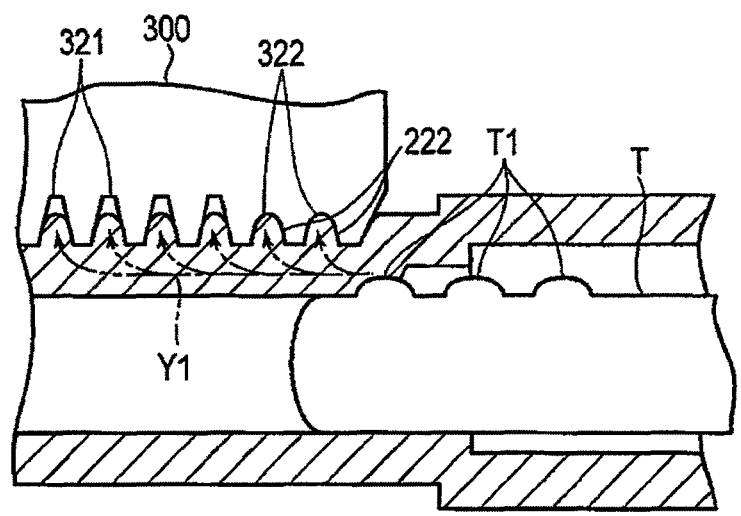
FIG. 6 is a partially side view illustrating a second step of the process of forming the rack bar.
Figure 7:
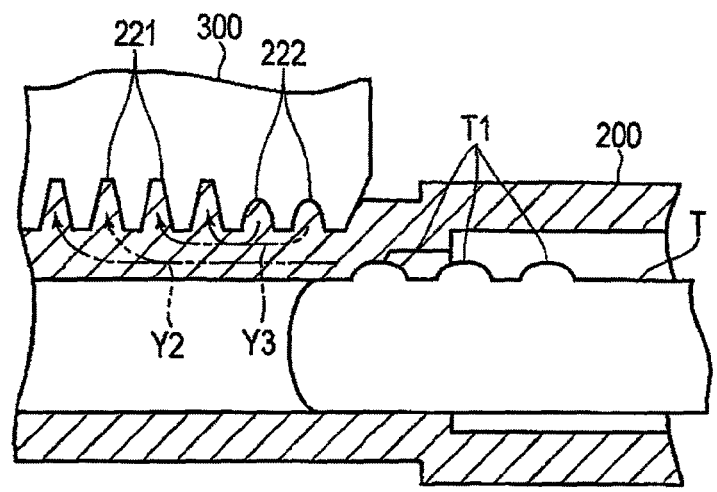
FIG. 7 is a partially cutaway side view illustrating a third step of the process of forming the rack bar.

FIGS. 5 to 7 are explanatory diagrams illustrating how to form the rack teeth 221 and the dummy teeth 222 by employing the teeth forming die 300. In FIGS. 6 and 7, T denotes a mandrel having projections T1 at an upper portion thereof.

Figure 8:
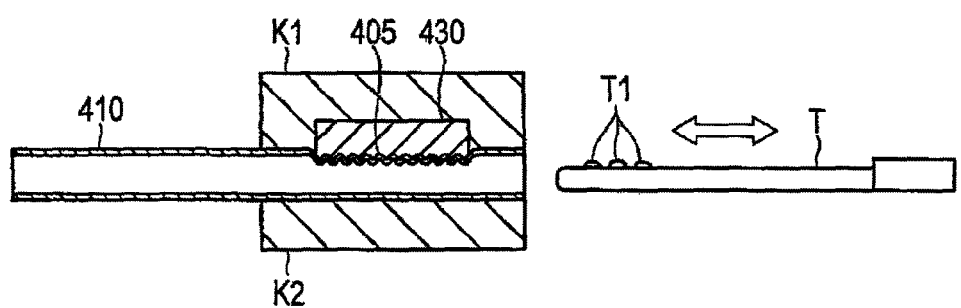
FIG. 8 is a partially cutaway side view of a general rack bar producing system.
Figure 9:
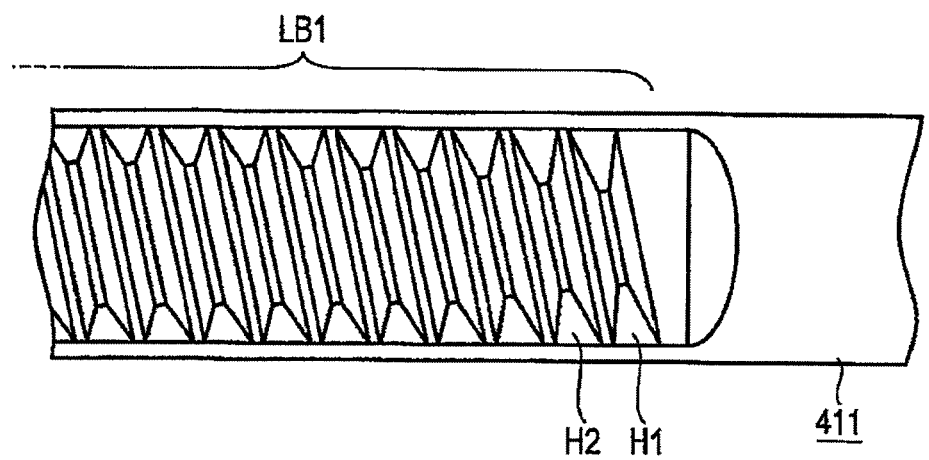
FIG. 9 is a plan view of an example of a main part of a general rack bar.
Figure 10:
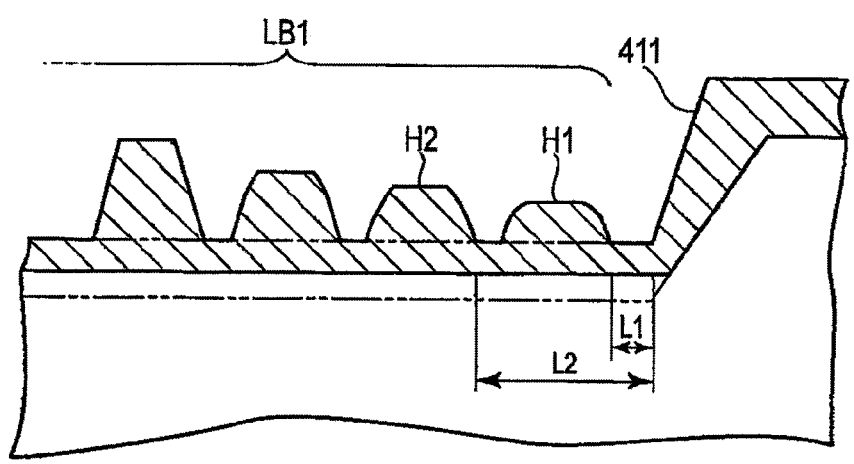
Figure 11:
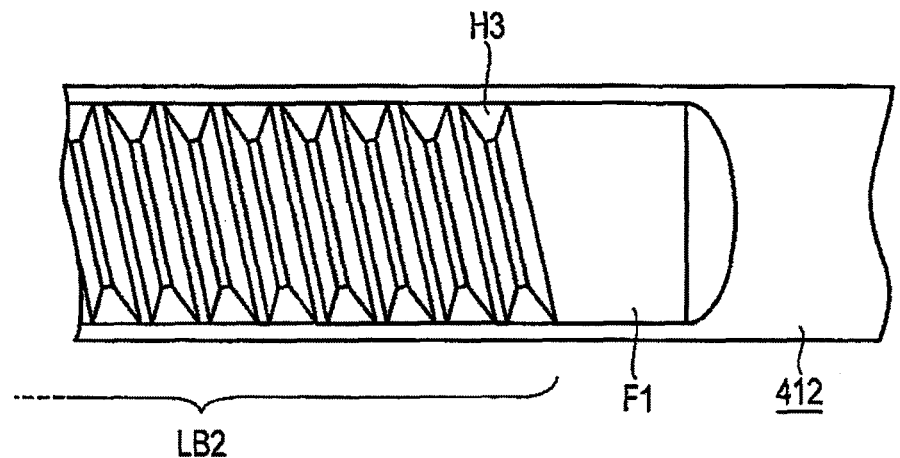
FIG. 11 is a plan of another example of as main part of a general a bar.
Figure 12:
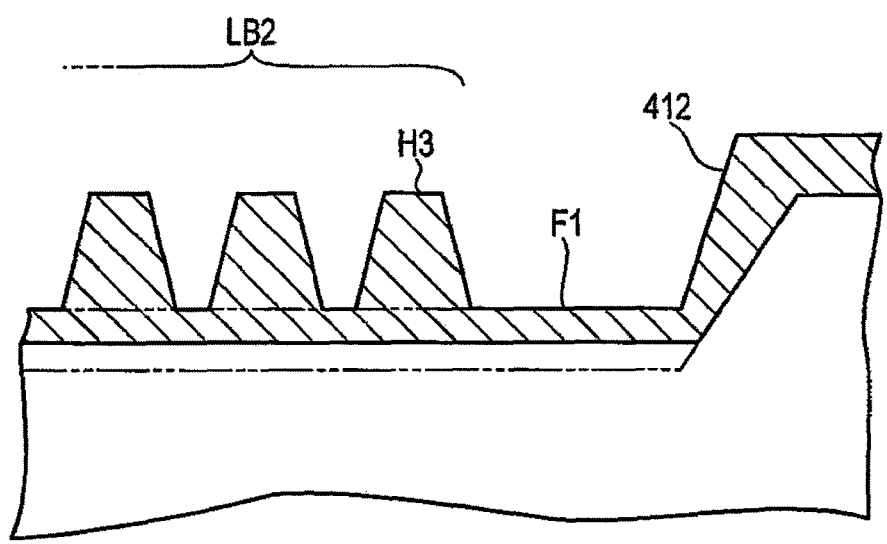
FIG. 12 is a sectional view of a portion of the general rack bar.

As shown in FIG. 8, forming rack teeth is implemented by employing a method in which the mandrel T is press fitted in the pipe member 200 which is fixed in place by molds K1, K2.

As shown in FIG. 5, in the rack bar (the pipe member) 200, a central portion is collapsed flat into a central recess shape to form a flat recess portion 230 in advance by employing a separate die. The pipe member 200 is fixed in place by the molds K1, K2 (refer to FIG. 8), and the teeth forming die 300 is in abutment with the flat recess portion 230.

As shown FIG. 6, after the pipe member 200 is fixed in place, the mandrel T is press fitted into an interior of the pipe member 200. As shown by Y1 in FIG. 6, a material at the flat recess portion 230 is forced out by the projecting portion T1 of the mandrel and is then supplied into the rack tooth transfer portions 321 and the dummy tooth transfer portions 322 on the teeth forming die 300 to project thereinto progressively. The mandrel which is fitted into the pipe member 200 is then replaced with a mandrel T having a slightly larger projecting portion T1, and the replacement mandrel T is press fined into the pipe member 200 in place of the previous mandrel T. By repeating the replacement of mandrels T and the press fitting of the mandrels T into the pipe member 200, rack teeth 221 and dummy teeth 222 are gradually formed. Since the dummy tooth transfer portions 322 are formed shallower than the rack tooth transfer portions 321, the dummy teeth 222 are formed earlier than the rack teeth 221.

As shown in FIG. 7 even after the dummy teeth 222 have been formed, by repeating the steps of replacing mandrels T and press hitting the mandrel T into the pipe member 200, rack teeth 222 are gradually formed as shown by Y3 in FIG. 7. Due to the dummy teeth 222 having already been formed completely, the material supplied into the dummy tooth transfer portions 322 is supplied into the rack tooth transfer portions 321 as extra material as shown by Y3 in FIG. 7, whereby rack teeth 221 are gradually formed.

In this way, in the embodiment of the invention, when the rack bar 200 is formed by employing the teeth forming die 300, it is possible to form the rack teeth 221 having the sufficient strength and durability and steering force transmission efficiency with the pinion mar even at the portion lying near the end portion in the axial direction C of the rack toothed portion 220 by supplying the extra material from the dummy teeth 222. In addition, by providing the dummy teeth, the sufficient strength can be provided even at the portion lying axially outwards of the rack toothed portion.

Thus, as has been described heretofore, according to the invention, it is possible that the rack bar has the sufficient strength and durability and steering force transmission efficiency with the pinion gear.

While the present invention has been described with reference to a certain exemplary embodiment thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A rack bar configured to mesh with a pinion gear, the rack bar comprising a hollow shaft portion, a rack toothed portion provided on the hollow shaft portion, and a dummy toothed portion,
    wherein the rack toothed portion comprises a plurality of rack teeth configured to mesh with the pinion gear,
    wherein the rack teeth are provided side by side in an axial direction of the shaft portion, each of the rack teeth comprising a contact face arranged obliquely relative to the axial direction to contact the pinion gear,
    wherein the dummy toothed portion comprises at least one dummy tooth provided on at least one side of the rack toothed portion in the axial direction such that the dummy tooth is arranged parallel to and next to the rack teeth,
    wherein the dummy tooth is designed such that a whole height of the dummy tooth is smaller than a whole height of each of the rack teeth, and
    wherein cross-sectional shapes of an interior surface of the hollow shaft portion corresponding with a location of the rack teeth and the at least one dummy tooth on an exterior of the hollow shaft portion are even along the axial direction.

2. A combination of a teeth forming die and a mandrel, the combination being configured to form rack teeth of a hollow rack bar to be meshed with a pinion gear, the teeth forming die comprising a securing portion configured to be secured to an outside clamp case, a rack teeth transfer portion provided on the securing portion, and at least one dummy tooth transfer portion,
    wherein the rack teeth transfer portion comprises a plurality of rack tooth transfer portions provided side by side in a line,
    wherein each of the rack tooth transfer portions is configured to transfer a profile of each rack tooth, and each of the rack tooth transfer portions comprises a contact face transfer portion arranged obliquely relative to a direction of the line in which the rack tooth transfer portions are provided side by side and configured to transfer a profile of a contact face of the rack tooth to be brought into contact with the pinion gear,
    wherein the dummy tooth transfer portion is configured to transfer a profile of a dummy tooth and is provided on at least one side of the rack teeth transfer portion in the direction of the line such that the dummy tooth transfer portion is arranged parallel to and next to the rack tooth transfer portions,
    wherein a whole depth of the dummy tooth transfer portion is shallower than a whole depth of the rack tooth transfer portions, and
    wherein the mandrel comprises a projecting portion configured to force, when the mandrel is axially press-fitted into an interior of a hollow pipe member, the material of the hollow pipe member into the dummy tooth transfer portion and into the rack tooth transfer portions to form the dummy tooth and the rack teeth.

3. The combination according to claim 2, further comprising:
    at least one additional mandrel sized to be sequentially press-fitted into an interior of the hollow shaft portion of the rack bar subsequent to the mandrel being axially press-fitted, to form the rack teeth and the at least one dummy tooth in concert with the external die.

4. The rack bar according to claim 1, wherein the at least one dummy tooth has a rounded profile.

5. A rack bar configured to mesh with a pinion gear, the rack bar comprising a hollow shaft portion, a rack toothed portion provided on the hollow shaft portion, and a dummy toothed portion,
    wherein the rack toothed portion comprises a plurality of rack teeth configured to mesh with the pinion gear,
    wherein the rack teeth are provided side by side in an axial direction of the shaft portion, each of the rack teeth comprising a contact face arranged obliquely relative to the axial direction to contact the pinion gear,
    wherein the dummy toothed portion comprises at least one dummy tooth provided on at least one side of the rack toothed portion in the axial direction such that the dummy tooth is arranged parallel to and next to the rack teeth,
    wherein the dummy tooth is designed such that a whole height of the dummy tooth is smaller than a whole height of each of the rack teeth, and
    wherein an interior surface of the hollow shaft portion corresponding with a location of the rack teeth and the dummy tooth on an exterior of the hollow shaft portion is axially consistent in cross section.

* * * * *